United States Patent
Kilchyk et al.

(10) Patent No.: US 12,474,721 B2
(45) Date of Patent: Nov. 18, 2025

(54) CONTROLLING FLOW OF A FLUID USING THERMALLY DEFORMABLE CHANNEL

(71) Applicant: Hamilton Sundstrand Corporation, Charlotte, NC (US)

(72) Inventors: Viktor Kilchyk, Lancaster, NY (US); Mark R. Gurvich, Middletown, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 419 days.

(21) Appl. No.: 18/067,700

(22) Filed: Dec. 16, 2022

(65) Prior Publication Data

US 2024/0201711 A1 Jun. 20, 2024

(51) Int. Cl.
*G05D 7/06* (2006.01)

(52) U.S. Cl.
CPC ................... *G05D 7/0635* (2013.01)

(58) Field of Classification Search
CPC ... G05D 7/0635; A61M 5/44; A61M 5/16881; A61M 5/16813; F16K 7/045; F16K 7/18; F16K 31/025
See application file for complete search history.

(56) References Cited

U.S. PATENT DOCUMENTS

| | | | |
|---|---|---|---|
| 5,984,257 A * | 11/1999 | Baek | F16K 31/025 236/99 A |
| 6,071,087 A | 6/2000 | Jalink et al. | |
| 7,107,777 B2 * | 9/2006 | Vaiyapuri | F04B 43/14 361/689 |
| 8,641,707 B2 | 2/2014 | Crowe et al. | |
| 9,671,030 B2 | 6/2017 | Dimascio et al. | |
| 10,393,287 B2 | 8/2019 | Baldea et al. | |
| 10,658,160 B2 | 5/2020 | Hiroki | |
| 2003/0010948 A1 | 1/2003 | Horiuchi et al. | |
| 2006/0078434 A1 * | 4/2006 | Kim | F04B 43/06 417/51 |
| 2007/0171257 A1 | 7/2007 | Yang | |
| 2007/0184238 A1 | 8/2007 | Hockaday et al. | |
| 2011/0097648 A1 | 4/2011 | Blank | |
| 2015/0096641 A1 | 4/2015 | Chow et al. | |

FOREIGN PATENT DOCUMENTS

CN 113190050 A 7/2021

OTHER PUBLICATIONS

Extended European Search Report dated Feb. 16, 2024, for corresponding European Application No. 23212292.9.

* cited by examiner

*Primary Examiner* — Christopher W Carter
(74) *Attorney, Agent, or Firm* — Kinney & Lange, P.A.

(57) ABSTRACT

Apparatus and associated methods relate to control of flow of a fluid within a fluid conductor having fluid-impenetrable walls surrounding a lumen. The fluid impenetrable walls have a rigid portion, a thermally-deformable portion, and a thermal heater and/or cooler thermally coupled to the thermally-deformable portion. The thermally-deformable portion has a geometrical form that changes in response to changes in temperature of the thermally deformable portion. A flow controller receives a signal indicative of a desired flow rate and controls the thermal heater so as to cause the thermally-deformable portion to deform thereby controlling the fluid flow to the desired flow rate.

20 Claims, 7 Drawing Sheets

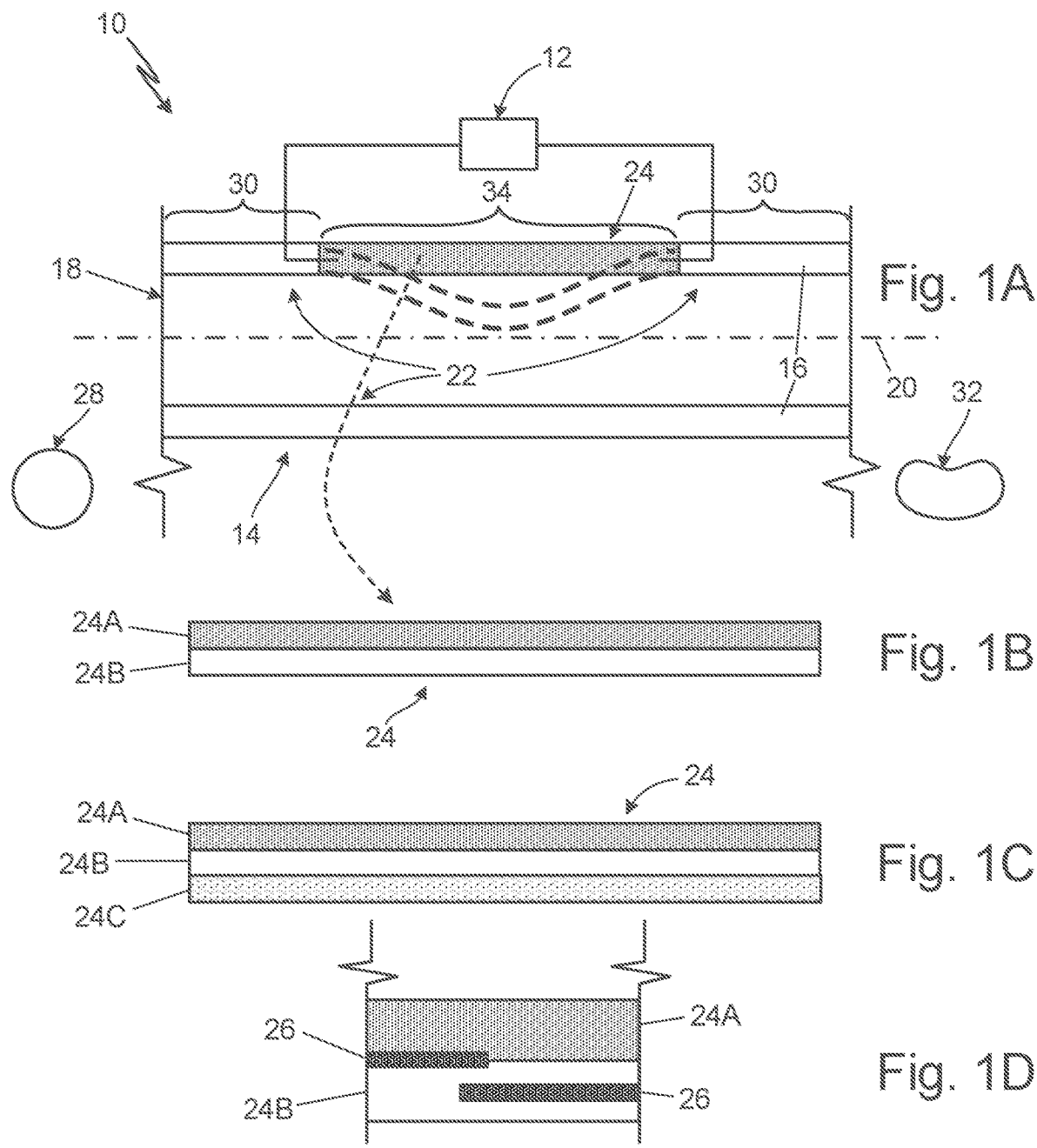

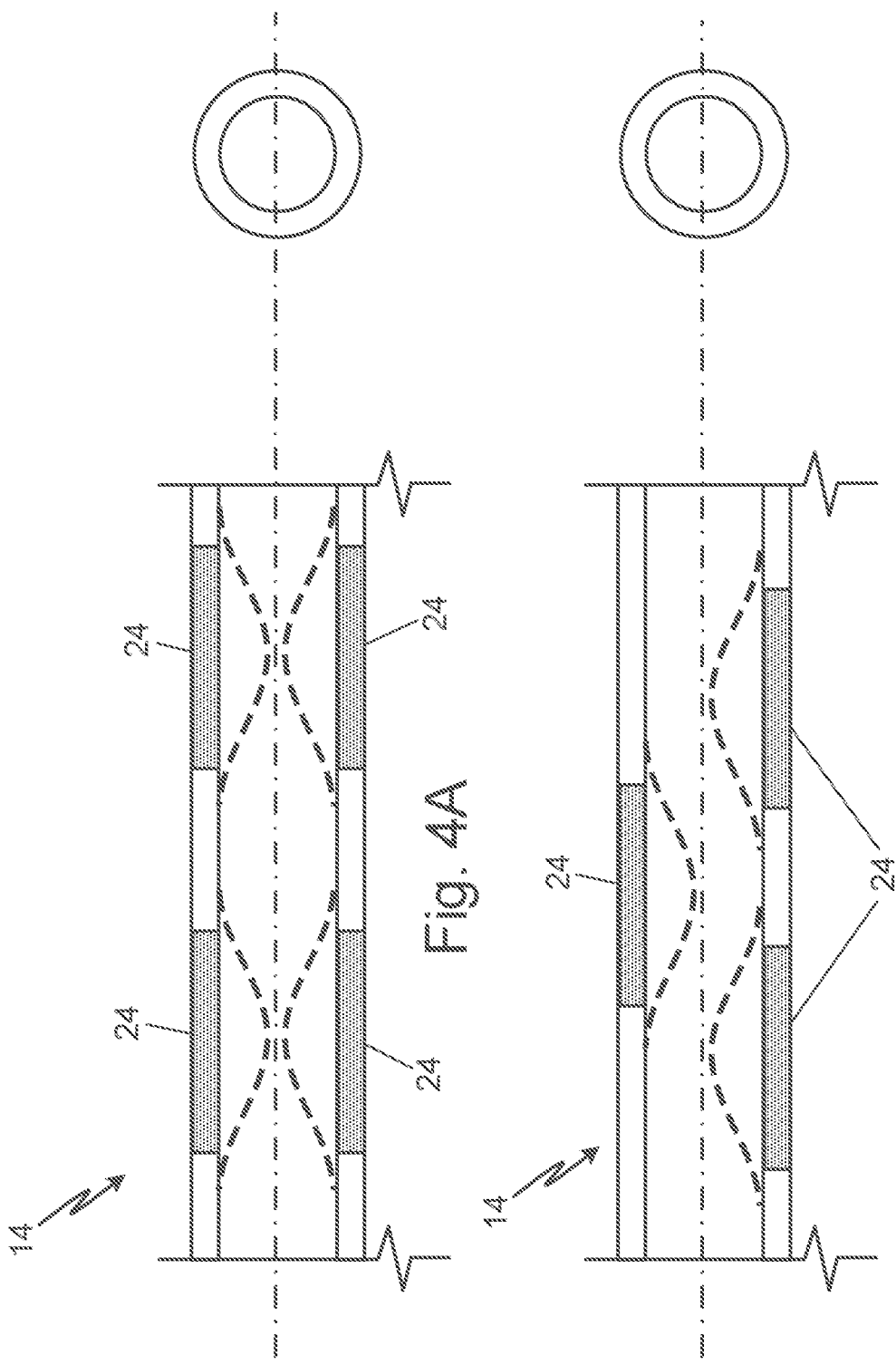

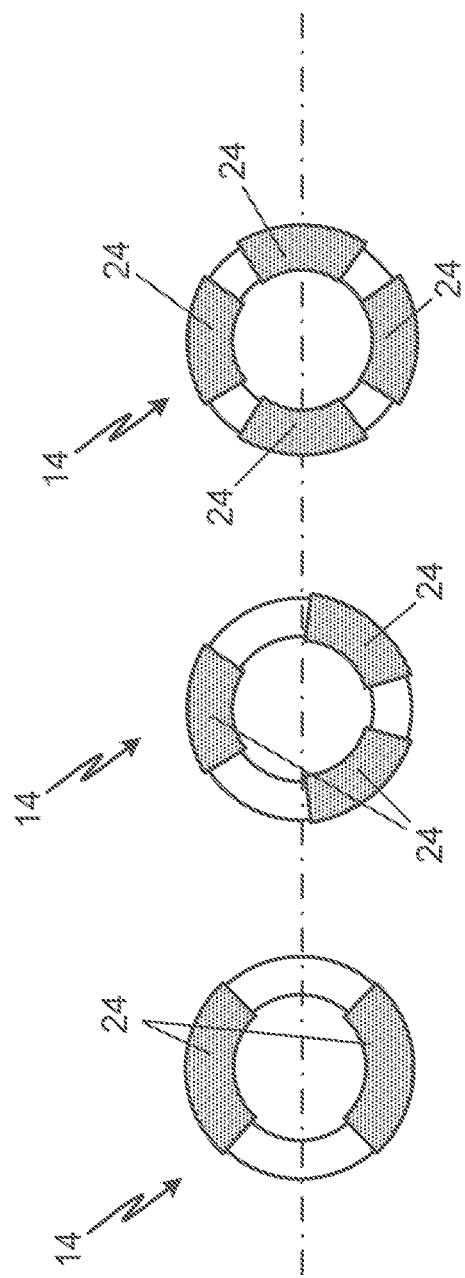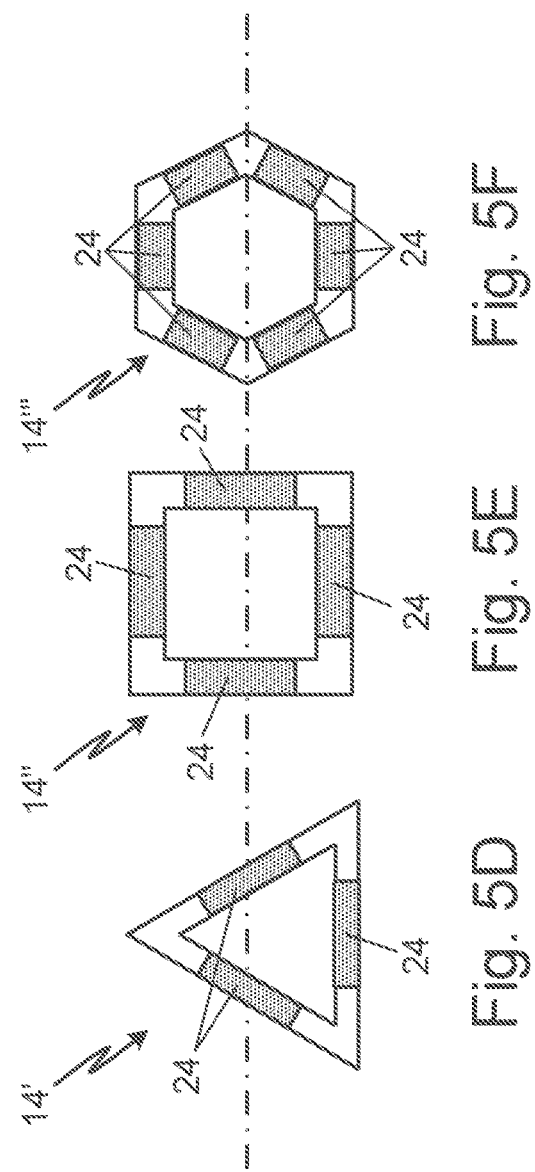

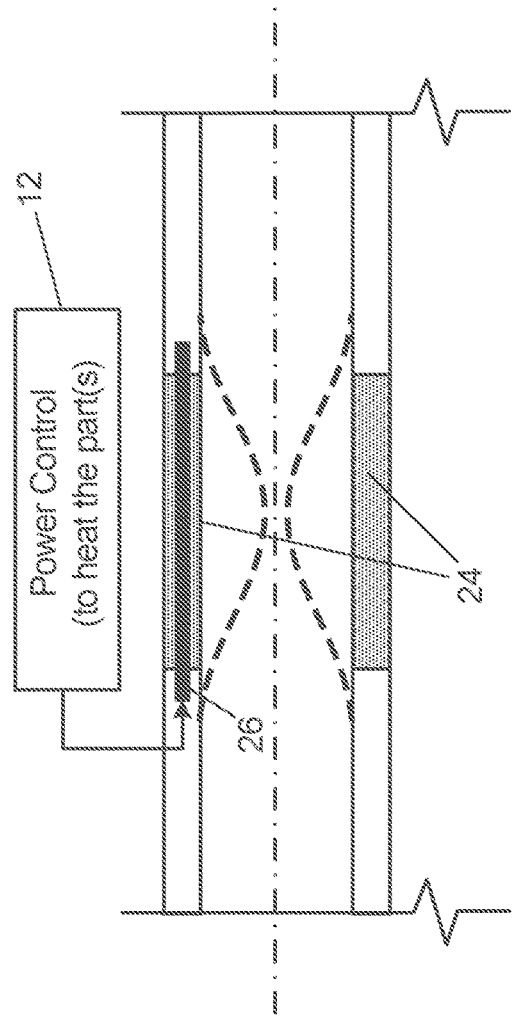
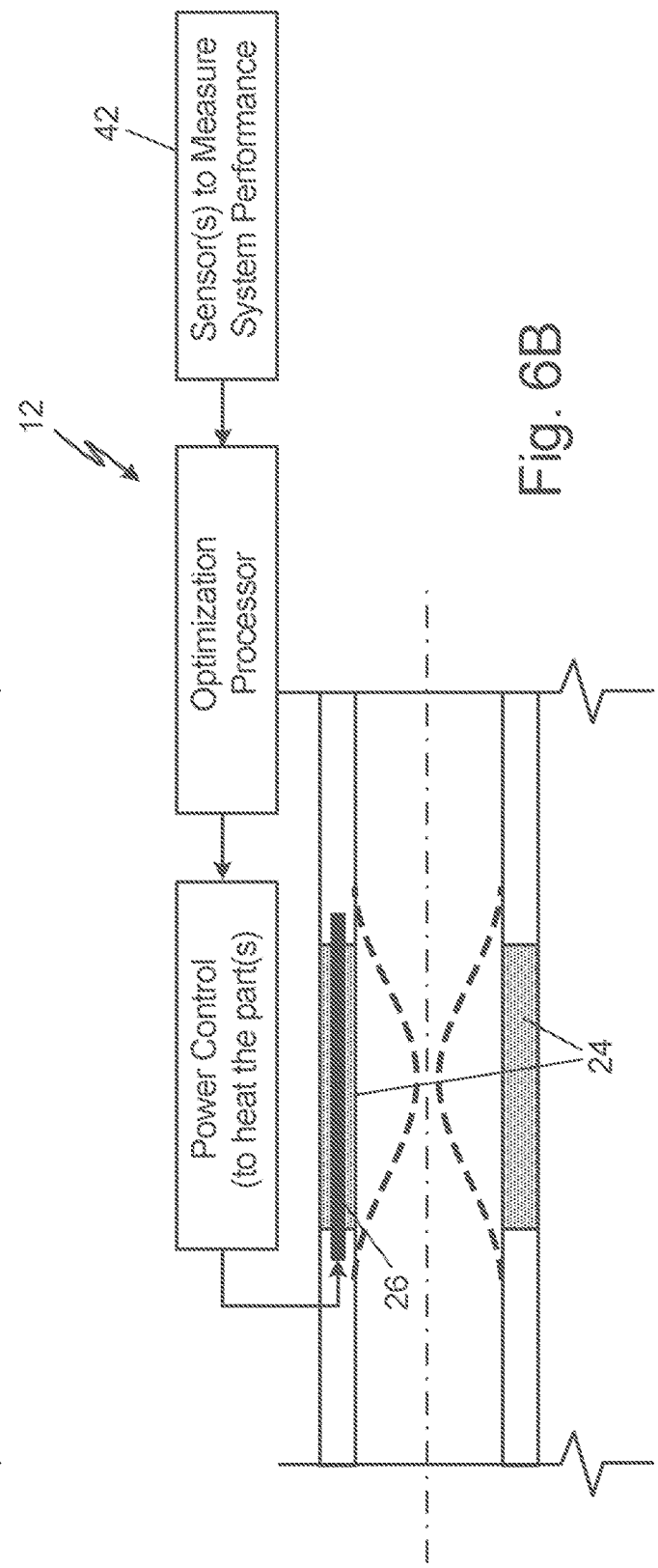

CONTROLLING FLOW OF A FLUID USING THERMALLY DEFORMABLE CHANNEL

BACKGROUND

Flow control of fluids are performed for myriad reasons. For example, gas flows are controlled in microelectronic manufacturing, chemical processing, environmental controlling, etc. Such control of fluid flow has been performed via a variety of methods using both active control methods and passive control methods. Often, when controlling fluid flow, undesirable side effects can occur, such as, for example: i) pressure drop across the flow controller, ii) flow disturbances, such as turbulence, cavitation, vortices, etc.; iii) sound effects, such as, noise, howling, whistling, etc.; and iv) physical movements, such as vibration, etc. These effects can result in secondary effects such as part failure, hearing damage, sub-optimal operation, fluid leakage etc. The present specification is directed to a new method of controlling flow of fluids that addresses the above listed problems.

SUMMARY

Some embodiments relate to a system for controlling flow of a fluid. The system includes a fluid conductor having fluid-impenetrable walls surrounding a lumen. The fluid impenetrable walls have a rigid portion and a thermally-deformable portion attached to the rigid portion. The thermally-deformable portion has a geometrical form that changes in response to changes in temperature of the thermally deformable portion. A cross-sectional geometry of the lumen changes in response to changes in the geometrical form of the thermally-deformable portion changes. The system has a heater and/or cooler thermally coupled to the thermally-deformable portion. The system also has a flow controller that receives a signal indicative of a desired flow rate. The flow controller is configured to control the heater and/or cooler so as to cause changes in the geometrical form of the thermally-deformable portion and corresponding changes in the cross-sectional geometry of the lumen, thereby controlling the fluid flow to the desired flow rate.

Some embodiments relate to a method for controlling flow of a fluid through a fluid conductor having fluid-impenetrable walls defining a lumen therewithin. The method includes receiving, via a flow controller, a signal indicative of a desired flow rate. The method includes controlling, via the flow controller, a heater and/or cooler thermally coupled to a thermally-deformable portion of the fluid-impenetrable wall. The method includes automatically changing geometry of the thermally-deformable portion in response to changes in temperature of the thermally-deformable portion. The method also includes automatically changing cross-sectional geometry of the lumen in response to changes in the geometry of the thermally-deformable portion, thereby controlling the fluid flow to the desired flow rate.

BRIEF DESCRIPTION OF THE DRAWINGS

FIGS. 1A-1D are cross-sectional views of a fluid flow controller that uses a thermally-deformable portion of a fluid conductor.

FIGS. 4A-4B are cross-sectional views of different embodiments a fluid flow controllers that use different axial arrangements of multiple thermally-deformable portions.

FIGS. 5A-5f are cross-sectional views of different embodiments a fluid flow controllers that use different peripheral arrangements of multiple thermally-deformable portions.

FIGS. 6A-6B are block-body diagrams of various controllers of fluid flow.

DETAILED DESCRIPTION

Figure 2A:
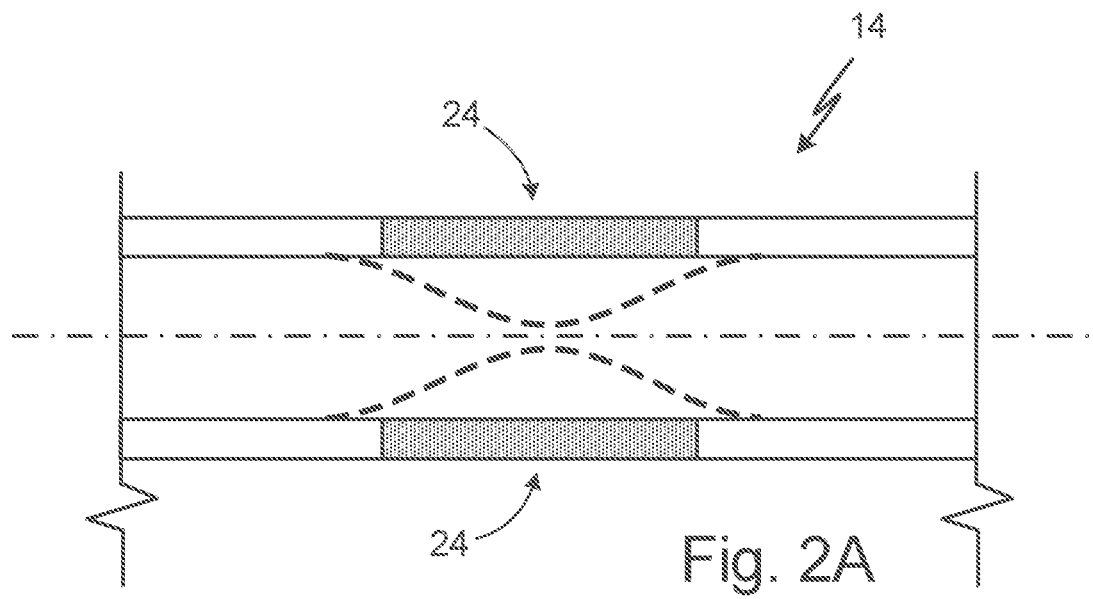
FIGS. 2A-2C are cross-sectional views of different embodiments of fluid flow controllers that use a thermally-deformable portion of a fluid conductor.

Apparatus and associated methods relate to control of flow of a fluid within a fluid conductor having fluid-impenetrable walls surrounding a lumen. The fluid impenetrable walls have a rigid portion, a thermally-deformable portion, and a heater and/or cooler thermally coupled to the thermally-deformable portion. The thermally-deformable portion has a geometrical form that changes in response to changes in temperature of the thermally deformable portion. A flow controller receives a signal indicative of a desired flow rate and controls the heater so as to cause the thermally-deformable portion to deform thereby controlling the fluid flow to the desired flow rate.

FIGS. 1A-1D are longitudinal cross-sectional views of a fluid flow controller that uses a thermally-deformable portion of a fluid conductor. In FIG. 1A, Fluid flow control system 10 includes flow controller 12 and fluid conductor 14. Fluid conductor 14 has fluid-impenetrable walls 16 forming lumen 18 therewithin. Fluid conductor 14 is configured to channel a flow of a fluid in lumen 18 in a direction of longitudinal axis 20. Fluid-impenetrable walls 16 have rigid portions 22 and thermally-deformable portion 24. Thermally-deformable portion 24 has a geometrical form that changes in response to changes in temperature of thermally deformable portion 24. Heater and/or cooler 26 is thermally coupled to the thermally-deformable portion 24. Flow controller 12 receives a signal indicative of a desired flow rate controls heater and/or cooler 26 so as to deform thermally-deformable portion 24 thereby controlling the fluid flow in accordance with the desired flow rate.

Thermally-deformable portion 24 is depicted in an undeformed state using solid lines, and in a deformed state using dashed lines. When in the undeformed state, thermally-deformable portion 24 forms a portion of fluid-impenetrable wall 16 in a manner consistent with rigid portions 22. By forming the portion of fluid-impenetrable wall in a "manner consistent" with rigid portions 22, it is meant that fluid conductor 14 has first cross-sectional geometry 28 when transversely cross-sectioned in static region 30 that is identical to second cross-sectional geometry 32 when transversely cross-sectioned in dynamic region 34. Transverse cross-sections are planar cross sections in planes having normal vectors parallel to longitudinal axis 20. In static region 30, first cross-sectional geometry 28 is defined only by rigid portions 22 of fluid conductor 14, and therefore first cross-sectional geometry 28 is static (i.e., it doesn't change). In dynamic region 34, second cross-sectional geometry 32 is defined, at least in part, by thermally-deformable portion 24 of fluid conductor 14, and therefore second cross-sectional geometry 32 is dynamic (i.e., it can change, and it does change in response to temperature changes).

In the embodiment depicted in FIG. 1A, when thermally-deformable portion 24 is in the deformed state, second cross-sectional geometry 32 has a smaller area than an area of first cross-sectional geometry 28. When thermally-deformable portion 24 is in the undeformed state, however, the area of second cross-sectional geometry 32 is substantially equal to the area of first cross-sectional geometry 28. These changes in the second cross-sectional area cause the fluid conductivity within fluid conductor 14 to be higher when thermally-deformable portion 24 is in the undeformed state and lower when thermally-deformable portion 24 is in the deformed state. Such changes in fluid conductivity can be used to control a flow rate of the fluid conducted within fluid conductor 14.

Because thermally-deformable portion 24 deforms in response to changes in temperature, heater and/or cooler 26 is thermally connected to thermally-deformable portion 24. Heater and/or cooler 26 can thermally engage an outer surface, in inner surface, or be embedded within thermally-deformable portion 24. Typically, heater and/or cooler 26 is a resistive heating element, but various other types of heaters and/or coolers can be used in addition to or instead of a resistive heating element. A flow controller provides power to the heater so as to control the temperature of thermally-deformable portion 24, which in turn causes thermally-deformable portion 24 to deform, which in turn affects the fluid conductivity of fluid conductor 14. Various methods of controlling flow will be described below, with reference to FIGS. 6A and 6B.

FIG. 1B is a cross-sectional view of thermally-deformable portion 24. Thermally-deformable portion 24 is a sandwich structure of two layers 24A and 24B of dissimilar materials. To promote thermal deformation of thermally-deformable portion 24, the two dissimilar materials are chosen as having different coefficients of thermal expansion. For example, thermally-deformable portion 24 can be a bimetallic structure. If top layer 24A has a coefficient of thermal expansion that is less than a coefficient of thermal expansion of bottom layer 24B, for example, then, when heated, thermally-deformable portion 24 will deform so as to be concave up. If, conversely, top layer 24A has a coefficient of thermal expansion that is greater than a coefficient of thermal expansion of bottom layer 24B, then, when heated, thermally-deformable portion 24 will deform so as to be concave down. Thermally-deformable portion 24 can be formed so as to deform in a predetermined manner via materials selection, layer thickness selection, as well as other considerations that will be explained in more detail below.

As depicted in FIG. 1A, thermally-deformable portion 24 is concave inward at both longitudinal ends and concave outward in its longitudinal center. Such changing concavity can be controlled by forming the end sections with an outer layer that has a coefficient of thermal expansion that is higher than its corresponding inner layer and forming the center section with an outer layer that has a coefficient of thermal expansion that is lower than its corresponding inner layer, for example.

FIG. 1C is a cross-sectional view of thermally-deformable portion 24 having a tri-layer structure. In FIG. 1B, thermally-deformable portion 24 is a sandwich structure of three layers 24A, 24B and 24C of dissimilar materials. As in the FIG. 1B embodiment, thermally-deformable portion 24 can be formed so as to deform in a predetermined manner via materials selection, and/or layer thickness selection, etc. Such materials selection of each of the three layers 24A, 24B and 24C can be performed so as to create a desired deformation geometry. In some embodiments, the coefficients of thermal expansion for the layers can be controlled by adding fibers (e.g., carbon fibers, glass fibers, etc) to a polymer or other base material. The type and/or density of fibers added to the base material can be used to control the thermal expansion of the layer. In other embodiments, thermally-deformable portion 24 can be created as a single layer with a graded density of fibers, for example. In such an embodiment, a desired deformation profile can be obtained by the grading profile, both in the thickness dimension, as well as the longitudinal and transverse dimensions of thermally-deformable portion 24.

FIG. 1D is a cross-sectional view of thermally-deformable portion 24 having a two-layer structure with embedded heaters. In FIG. 1D, thermally-deformable portion 24 has resistive heating elements 26A and 26B. Typically only one heating element is used to heat thermally-deformable portion 24, but in FIG. 1D, two are depicted to demonstrate two of the possible locations for such resistive heating elements. Resistive heating element 26A is sandwiched between first and second layers 24A and 24B. Resistive heating element 26B is embedded inside of second layer 24B. In other embodiments, a resistive heating element can be embedded inside first layer 24A, on outside surface of first layer 24A, or on inside surface of second layer 24B, for example. In some embodiments, an electrical insulator can electrically isolate the resistive heating element from any conductive materials proximate to the resistive heating element. For example, a thin electrical insulator can surround an embedded resistive heating element, or an electrically insulative layer can be sandwiched between the resistive heating element and a surface engaged thereby. In embodiments in which the engaging surfaces of thermally-deformable portion 24 is not electrically conductive, electrical insulation of the resistive heating element might not be needed.

Figure 2B:
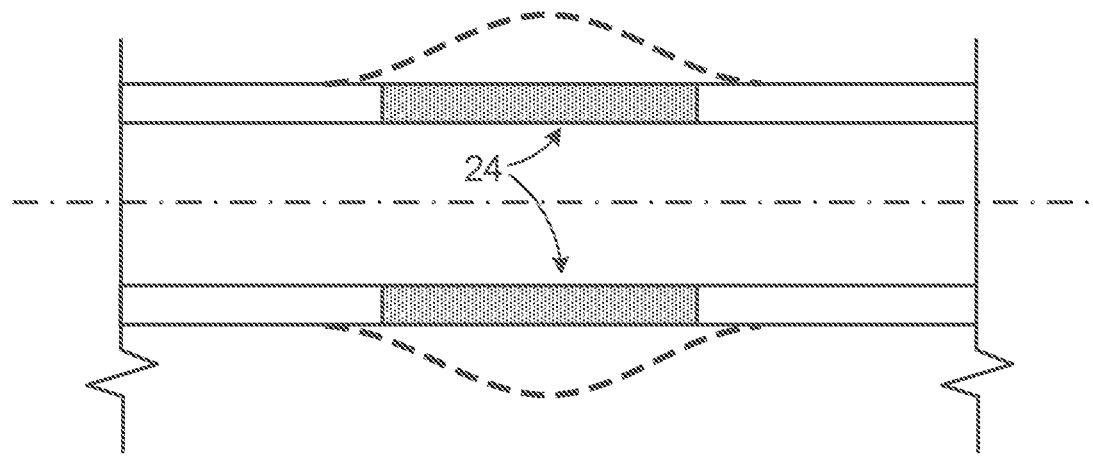
Figure 2C:
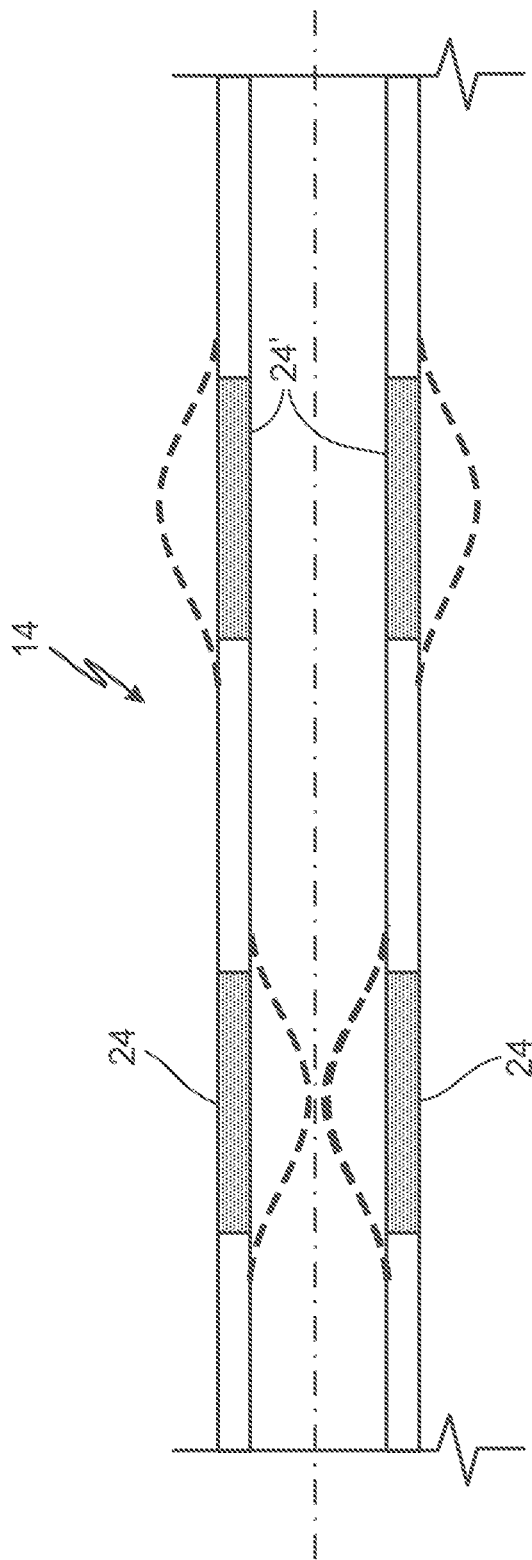

FIGS. 2A-2C are cross-sectional views of different embodiments of fluid flow controllers that use a thermally-deformable portion of a fluid conductor. In FIG. 2A, fluid conductor 14 has thermally-deformable portion 24, which is configured to deform in an inward direction, thereby reducing fluid conductivity of fluid conductor 14, when deformed. In FIG. 2B, fluid conductor 14 has thermally-deformable portion 24', which is configured to deform in an outward direction, thereby increasing fluid conductivity of fluid conductor 14, when deformed. In FIG. 2C, fluid conductor 14 has first thermally-deformable portion 24 and second thermally-deformable portion 24'. First thermally-deformable portion 24 is configured to deform in an inward direction, thereby reducing fluid conductivity of fluid conductor 14. Second thermally-deformable portion 24' is configured to deform in an outward direction, thereby reducing fluid conductivity of fluid conductor 14. Use of both such thermally-deformable portions 24 and 24' can facilitate greater control over fluid conductivity.

Figure 3A:
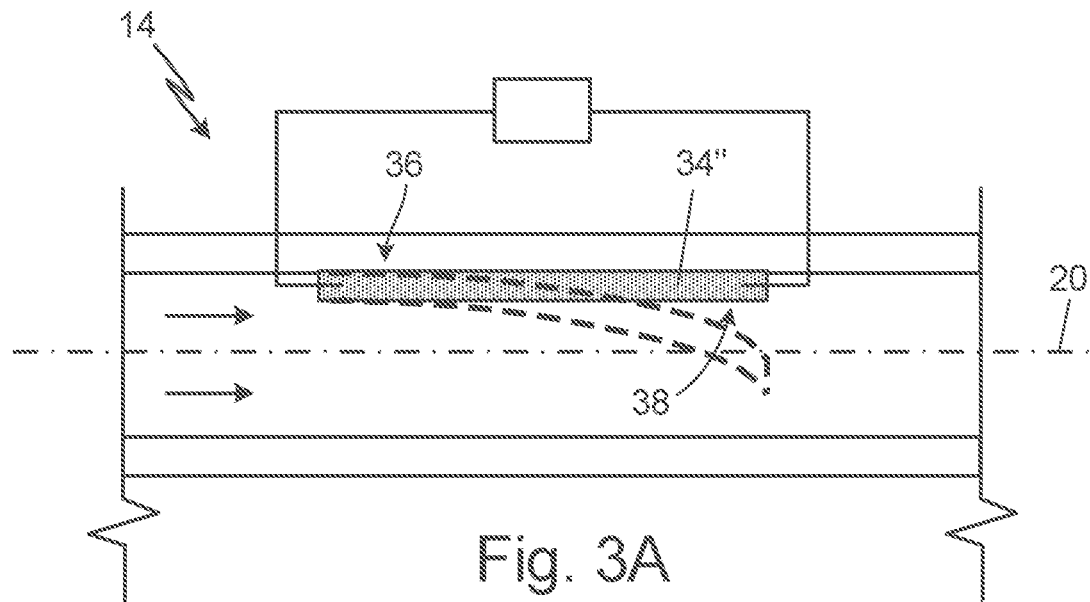
FIGS. 3A-3B are cross-sectional views of different embodiments of fluid flow controllers that use cantilever-type thermally-deformable portions.
Figure 3B:
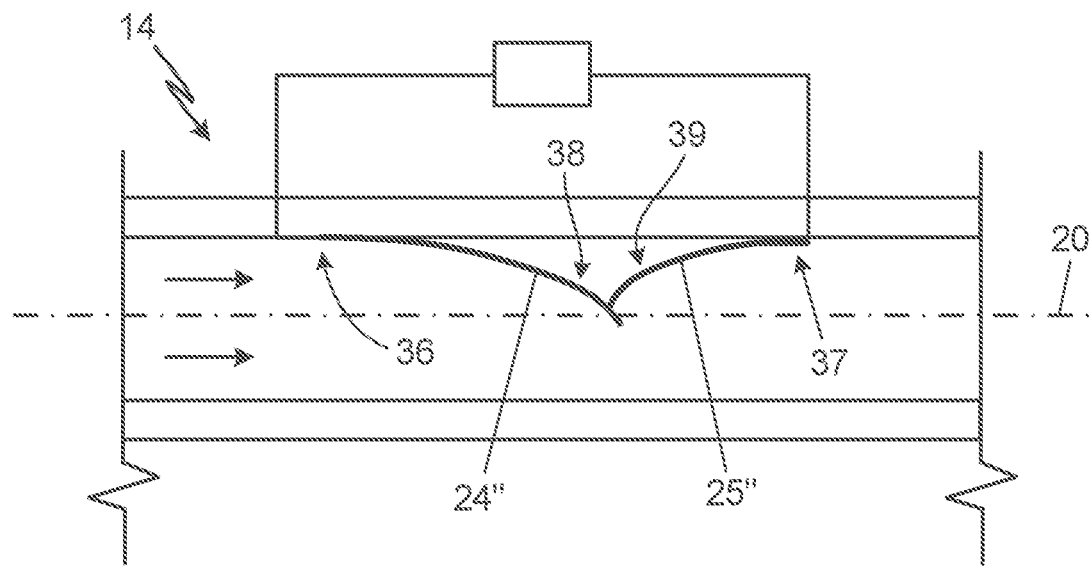

FIGS. 3A-3B are cross-sectional views of different embodiments of fluid flow controllers that use cantilever-type thermally-deformable portions. In FIG. 3A, fluid conductor 14 has fluid-impenetrable walls that are rigid throughout its length and circumference (e.g., like a rigid pipe). A thermally-deformable member (or portion) 24" is fixedly attached at first longitudinal end 36 and unattached at second longitudinal end 38. Thermally-deformable member 24" is depicted in an undeformed state using solid lines, and in a deformed state using dashed lines. When in its undeformed state, thermally-deformable member 24" is proximate inner surface 40 of fluid conductor 14 along its entire length. When in its deformed state, thermally-deformable member 24" deforms in a concave-inward fashion, thereby projecting unattached second longitudinal end 38 into lumen 18 of fluid conductor 14. Such projection of unattached second longitudinal end 38 into lumen 18 of fluid conductor 14 reduces the fluid conductivity of fluid conductor 14, thereby reducing the flow rate of the fluid therein.

In FIG. 3B, fluid conductor 14 again has fluid-impenetrable walls that are rigid throughout its length and circumference (e.g., like a rigid pipe). Two thermally-deformable members (or portions) 24" and 25" are fixedly attached at first longitudinal ends 36 and 37 and unattached at second longitudinal ends 38 and 39, respectively. In such an embodiment, one of thermally-deformable members 24" and 25" can provide additional support to the other of thermally-deformable members 24" and 25". For example, unattached longitudinal end 39 of thermally-deformable member 25" can support unattached longitudinal end 38 of the other of thermally-deformable member 24". Unattached longitudinal ends 38 and 39 of thermally-deformable members 24" and 25" can slidably and/or hingeably engage one another, for example.

FIGS. 4A-4B are cross-sectional views of different embodiments a fluid-flow controllers that use different axial arrangements of multiple thermally-deformable portions. In FIG. 4A, thermally-deformable members 24 are arranged in an axis-symmetric manner. Axis-symmetric arrangement is an arrangement in which two or more thermally-deformable members 24 are located at substantially the same longitudinal position, but at different locations around the circumference of fluid conductor 14. Axis-symmetric arrangement of thermally-deformable members 24 facilitates a large dynamic range of control of flow of fluids. Such axis-symmetric arrangement can control fluid flow from zero flow to the full flow permitted by the cross-sectional geometry of fluid conductor 14.

In FIG. 4B, thermally-deformable members 24 are arranged in an asymmetric manner. Asymmetric arrangement is an arrangement in which two or more thermally-deformable members 24 are located at different longitudinal positions of fluid conductor 14. Axis-symmetric arrangement of thermally-deformable members 24 can be used to control how the fluid flows within fluid conductor 14. For example, flow can be routed circuitously around thermally-deformable members 24. In some embodiments, thermally-deformable members 24 can be configured to induce vortices or cause turbulence within fluid conductor 14.

FIGS. 5A-5F are cross-sectional views of different embodiments a fluid-flow controllers that use different peripheral arrangements of multiple thermally-deformable portions. In FIG. 5A-5F, transverse cross-sections are shown of various geometries of fluid conductors 14, 14', 14", and 14'" and various arrangements of thermally-deformable portions 24. In FIGS. 5A-5C, fluid conductor 14 has a circular cross-sectional profile. In FIG. 5D, fluid conductor 14' has a triangular cross-sectional profile. In FIG. 5E, fluid conductor 14" has a square cross-sectional profile. In FIG. 5F, fluid conductor 14'" has a hexagonal cross-sectional profile. Various other cross-sectional profiles, as well. The cross-sectional profile can be selected, for example, so as to fit in space available. Various cross-sectional profiles invite various arrangements of thermally-deformable portions so as to control fluid flow therein for the desired operational function performed thereby.

In FIG. 5A, two thermally-deformable portions 24 are arranged opposite one another. In FIGS. 5B and 5D, three thermally-deformable portions 24 are distributed about a periphery of fluid conductors 14 and 14'. In FIGS. 5C and 5E, four thermally-deformable portions 24 are distributed about a periphery of fluid conductors 14 and 14". In FIG. 5F, six thermally-deformable portions 24 are distributed about a periphery of fluid conductors 14'". Although thermally-deformable portions are depicted as being arranged in axis-symmetric fashion in FIGS. 5A-5F, thermally-deformable portions can peripherally located as depicted in FIGS. 5A-5F while being axis-asymmetrically arranged. Such arrangements can induce rotational flow, for example, within fluid conductor 14.

FIGS. 6A-6B are block-body diagrams of various controllers of fluid flow. In FIG. 6A, open loop control of heater 20 is depicted. Such open-loop control can be performed in response to a signal indicative of a desired flow rate. Such a signal can be generated by user via a user interface or via a signal generated via another manner. For example, computer control of a chemical plant can generate signals for various flow rates.

In FIG. 6B, flow controller 12 can receive a signal of actual flow rate as measured by flow sensor 42. Flow controller 12 receives the signal indicative of the desired flow rate and compares the received signal indicative of desired flow rate with the signal of actual flow rate. Flow controller 12 can then use closed-loop control to control the flow rate so that actual flow rates, as measured by flow sensor 42, is substantially equal to the desired flow rate as indicated by the signal received. For example, flow controller 12 can use a Proportional, Integral, Derivative (PID) method of closed loop control. Other methods of closed loop control can be used instead of PID control.

Discussion of Possible Embodiments

The following are non-exclusive descriptions of possible embodiments of the present invention.

Some embodiments relate to a system for controlling flow of a fluid. The system includes a fluid conductor having fluid-impenetrable walls surrounding a lumen. The fluid impenetrable walls have a rigid portion and a thermally-deformable portion attached to the rigid portion. The thermally-deformable portion has a geometrical form that changes in response to changes in temperature of the thermally deformable portion. A cross-sectional geometry of the lumen changes in response to changes in the geometrical form of the thermally-deformable portion changes. The system has a heater and/or cooler thermally coupled to the thermally-deformable portion. The system also has a flow controller that receives a signal indicative of a desired flow rate. The flow controller is configured to control the heater and/or cooler so as to cause changes in the geometrical form of the thermally-deformable portion and corresponding changes in the cross-sectional geometry of the lumen, thereby controlling the fluid flow to the desired flow rate.

The system of the preceding paragraph can optionally include, additionally and/or alternatively, any one or more of the following features, configurations and/or additional components:

A further embodiment of the foregoing system, wherein the flow controller can control fluid flow rate using open-loop control.

A further embodiment of any of the foregoing systems, further including a flow sensor configured to sense flow rate of the fluid flow within the fluid conductor and to generate a signal indicative of a flow rate sensed. The flow controller can be further configured to receive the signal indicative of the fluid flow and to control the flow rate using closed-loop control.

A further embodiment of any of the foregoing systems, wherein the heater and/or cooler can be embedded within the deformable section.

A further embodiment of any of the foregoing systems, wherein the heater and/or cooler can be electrically isolated from a surface of the deformable section to which it thermally engages.

A further embodiment of any of the foregoing systems, wherein the thermally-deformable portion can include first and second layers with dissimilar coefficients of thermal expansion.

A further embodiment of any of the foregoing systems, wherein the heater and/or cooler can be between the first and second layers.

A further embodiment of any of the foregoing systems, wherein the thermally-deformable portion can have a first region(s) and a second region, a first end of the first region(s) mechanically connecting to the rigid portion, a second end of the first region mechanically connecting to the second region. The first region can be configured to deform with an inward concavity with respect to the longitudinal axis, and the second region can be configured to deform with an outward concavity with respect to the longitudinal axis.

A further embodiment of any of the foregoing systems, wherein the thermally-deformable portion can be configured to deform in such a manner as to restrict fluid flow when deformed.

A further embodiment of any of the foregoing systems, wherein the thermally-deformable portion can be configured to deform in such a manner as to enhance fluid flow when deformed.

A further embodiment of any of the foregoing systems, wherein the thermally-deformable portion can reside entirely within the rigid portion.

A further embodiment of any of the foregoing systems, wherein the thermally-deformable portion is attached at a first longitudinal position within the fluid conductor and not attached at other peripheral regions of the thermally-deformable portion so as restrict fluid flow by extending within the fluid conductor in cantilever fashion, when deformed.

A further embodiment of any of the foregoing systems, wherein the thermally-deformable portion is a first thermally-deformable portion. The system can further include a second thermally-deformable portion attached at a second longitudinal position within the fluid conductor and not attached at other peripheral regions of the second thermally-deformable portion so as restrict fluid flow by extending within the fluid conductor in cantilever fashion, when deformed.

A further embodiment of any of the foregoing systems, wherein the second thermally-deformable portion can provide support to the first thermally-deformable portion.

A further embodiment of any of the foregoing systems, wherein the thermally-deformable portion can fill an aperture or hole of the rigid portion so the thermally-deformable portion together with the rigid portion contain the fluid therewithin.

A further embodiment of any of the foregoing systems, wherein the thermally-deformable portion can be one of a plurality of thermally-deformable portions arrange around a periphery of the of the fluid conductor.

A further embodiment of any of the foregoing systems, wherein the thermally-deformable portion is a first thermally-deformable portion. The system can further include a second thermally-deformable portion axis-symmetrically located with respect to the first thermally-deformable portion.

A further embodiment of any of the foregoing systems, wherein the thermally-deformable portion is a first thermally-deformable portion. The system can further include a second thermally-deformable portion axis-asymmetrically located with respect to the first thermally-deformable portion.

Some embodiments relate to a method for controlling flow of a fluid through a fluid conductor having fluid-impenetrable walls defining a lumen therewithin. The method includes receiving, via a flow controller, a signal indicative of a desired flow rate. The method includes controlling, via the flow controller, a heater and/or cooler thermally coupled to a thermally-deformable portion of the fluid-impenetrable wall. The method includes automatically changing geometry of the thermally-deformable portion in response to changes in temperature of the thermally-deformable portion. The method also includes automatically changing cross-sectional geometry of the lumen in response to changes in the geometry of the thermally-deformable portion, thereby controlling the fluid flow to the desired flow rate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for controlling flow of a fluid, the system comprising:
   a fluid conductor having fluid-impenetrable walls defining a lumen therewithin, the fluid impenetrable walls having:
      a rigid portion; and
      a thermally-deformable portion attached to the rigid portion, the thermally-deformable portion having a geometrical form that changes in response to changes in temperature of the thermally deformable portion, wherein a cross-sectional geometry of the lumen changes in response to changes in the geometrical form of the thermally-deformable portion changes, the thermally-deformable portion having a first region and a second region, the first region configured to deform with an inward concavity with respect to the longitudinal axis, and the second region configured to deform with an outward concavity with respect to the longitudinal axis;
   a heater and/or cooler thermally coupled to the thermally-deformable portion; and
   a flow controller that receives a signal indicative of a desired flow rate, the flow controller configured to control the heater and/or cooler so as to cause changes in the geometrical form of the thermally-deformable portion and corresponding changes in the cross-sectional geometry of the lumen, thereby controlling the fluid flow to the desired flow rate.

2. The system of claim 1, wherein the flow controller controls fluid flow rate using open-loop control.

3. The system of claim 1, further comprising:
   a flow sensor configured to sense flow rate of the fluid flow within the fluid conductor and to generate a signal indicative of a flow rate sensed, wherein the flow controller is further configured to receive the signal indicative of the fluid flow and to control the flow rate using closed-loop control.

4. The system of claim 1, wherein the heater and/or cooler is embedded within the deformable section.

5. The system of claim 1, wherein the heater and/or cooler thermally engages a surface of the deformable section.

6. The system of claim 1, wherein the heater and/or cooler is electrically isolated from the surface of the deformable section to which it thermally engages.

7. The system of claim 6, wherein the thermally-deformable portion comprises first and second layers with dissimilar coefficients of thermal expansion.

8. The system of claim 6, wherein the heater and/or cooler is between the first and second layers.

9. The system of claim 6, wherein a first end of the first region(s) mechanically connects to the rigid portion, a second end of the first region mechanically connects to the second region.

10. The system of claim 1, wherein the first region of the thermally-deformable portion is configured to deform in such a manner as to restrict fluid flow when deformed.

11. The system of claim 1, wherein the second region of the thermally-deformable portion is configured to deform in such a manner as to enhance fluid flow when deformed.

12. The system of claim 1, wherein the thermally-deformable portion fills an aperture or hole of the rigid portion so the thermally-deformable portion together with the rigid portion contain the fluid therewithin.

13. The system of claim 1, wherein the thermally-deformable portion is one of a plurality of thermally-deformable portions arrange around a periphery of the of the fluid conductor.

14. The system of claim 1, wherein the thermally-deformable portion is a first thermally-deformable portion, the system further comprising:
a second thermally-deformable portion axis-symmetrically located with respect to the first thermally-deformable portion.

15. The system of claim 1, wherein the thermally-deformable portion is a first thermally-deformable portion, the system further comprising:
a second thermally-deformable portion axis-asymmetrically located with respect to the first thermally-deformable portion.

16. A system for controlling flow of a fluid, the system comprising:
a fluid conductor having fluid-impenetrable walls defining a lumen therewithin, the fluid impenetrable walls having:
a rigid portion; and
a thermally-deformable portion attached to the rigid portion, the thermally-deformable portion having a geometrical form that changes in response to changes in temperature of the thermally deformable portion, wherein a cross-sectional geometry of the lumen changes in response to changes in the geometrical form of the thermally-deformable portion changes;
a heater and/or cooler thermally coupled to the thermally-deformable portion; and
a flow controller that receives a signal indicative of a desired flow rate, the flow controller configured to control the heater and/or cooler so as to cause changes in the geometrical form of the thermally-deformable portion and corresponding changes in the cross-sectional geometry of the lumen, thereby controlling the fluid flow to the desired flow rate,
wherein the thermally-deformable portion resides entirely within the rigid portion.

17. The system of claim 16, wherein the thermally-deformable portion is attached at a first longitudinal position within the fluid conductor and is not attached at other peripheral regions of the thermally-deformable portion so as restrict fluid flow by extending within the fluid conductor in cantilever fashion, when deformed.

18. The system of claim 17, wherein the thermally-deformable portion is a first thermally-deformable portion, the system further comprising:
a second thermally-deformable portion attached at a second longitudinal position within the fluid conductor and not attached at other peripheral regions of the second thermally-deformable portion so as restrict fluid flow by extending within the fluid conductor in cantilever fashion, when deformed.

19. The system of claim 18, wherein the second thermally-deformable portion provides support to the first thermally-deformable portion.

20. A method for controlling flow of a fluid through a fluid conductor having fluid-impenetrable walls defining a lumen therewithin, the method comprising:
receiving, via a flow controller, a signal indicative of a desired flow rate;
controlling, via the flow controller, a heater and/or cooler thermally coupled to a thermally-deformable portion of the fluid-impenetrable walls, the thermally-deformable portion having a first region and a second region, the first region configured to deform with an inward concavity with respect to a longitudinal axis, and the second region configured to deform with an outward concavity with respect to the longitudinal axis;
automatically changing geometry of the thermally-deformable portion in response to changes in temperature of the thermally-deformable portion; and
automatically changing cross-sectional geometry of the lumen in response to changes in the geometry of the thermally-deformable portion, thereby controlling the fluid flow to the desired flow rate.

* * * * *